(12) United States Patent
Liu et al.

(10) Patent No.: US 9,630,852 B2
(45) Date of Patent: Apr. 25, 2017

(54) GRAPHENE MATERIAL AND METHOD OF PREPARING THE SAME

(71) Applicant: Jianhong Liu, Shenzhen (CN)

(72) Inventors: Jianhong Liu, Shenzhen (CN); Qianling Zhang, Shenzhen (CN); Chuanxin He, Shenzhen (CN); Jian Xu, Shenzhen (CN); Chao Hu, Shenzhen (CN)

(73) Assignee: SHENZHEN EIGEN-EQUATION GRAPHENE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/848,274

(22) Filed: Sep. 8, 2015

(65) Prior Publication Data

US 2016/0068396 A1  Mar. 10, 2016

(30) Foreign Application Priority Data

Sep. 9, 2014  (CN) .......................... 2014 1 0454395

(51) Int. Cl.
*C01B 31/04* (2006.01)

(52) U.S. Cl.
CPC ...... *C01B 31/0446* (2013.01); *C01B 31/0438* (2013.01)

(58) Field of Classification Search
CPC . C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; C01B 31/0446
USPC ........................................................ 423/448
See application file for complete search history.

(56) References Cited

U.S. PATENT DOCUMENTS

| 2004/0033189 A1* | 2/2004 | Kaschak | ................ | B82Y 30/00 |
| | | | | 423/448 |
| 2013/0277620 A1* | 10/2013 | Liu | ....................... | H01M 4/364 |
| | | | | 252/506 |

* cited by examiner

*Primary Examiner* — Daniel C McCracken
(74) *Attorney, Agent, or Firm* — Matthias Scholl P.C.; Matthias Scholl

(57) ABSTRACT

A method of preparing a graphene material. The method includes: (1) preparing a liquid polyacrylonitrile (LPAN) solution, stirring the LPAN solution to yield a cyclized polyacrylonitrile solution; (2) stirring the cyclized LPAN solution at between 200 and 300° C. to yield a thermally-oxidized polyacrylonitrile; (3) grinding and sieving the thermally-oxidized polyacrylonitrile, and drying a resulting product at room temperature, to yield a thermally-oxidized precursor; (4) calcining the thermally-oxidized precursor in the presence of an inert gas flow of between 10 and 500 mL/min for between 1 and 24 hrs at the temperature of between 400 and 1000° C., to yield a carbonized precursor; and (5) calcining the carbonized precursor in the presence of an inert gas flow of between 10 and 500 mL/min for between 1 and 10 hrs at the temperature of between 1000 and 3000° C., to yield a graphene material.

8 Claims, 4 Drawing Sheets

GRAPHENE MATERIAL AND METHOD OF PREPARING THE SAME

CROSS-REFERENCE TO RELATED APPLICATIONS

Pursuant to 35 U.S.C. §119 and the Paris Convention Treaty, this application claims the foreign priority benefit of Chinese Patent Application No. 201410454395.2 filed Sep. 9, 2014, the contents of which, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

Field of the Invention

The invention relates to a graphene material and method of preparing the same.

Description of the Related Art

Existing preparation methods of graphene, including mechanical stripping method, graphite oxide reduction method, chemical vapor deposition method, epitaxial growth method, electrochemical method, and electric arc method, all can only be carried out on small scale; large scale methods have, heretofore, been elusive.

SUMMARY OF THE INVENTION

In view of the above-described problems, it is one objective of the invention to provide a method of preparing a graphene material that has a simple process and is suitable for large-scale industrial production.

To achieve the above objective, in accordance with one embodiment of the invention, there is provided a method of preparing a graphene material, the method comprising:

(1) preparing a liquid polyacrylonitrile (LPAN) solution, stirring the LPAN solution at between 80 and 300° C. for between 8 and 72 hrs to yield a cyclized polyacrylonitrile solution;

(2) stirring the cyclized LPAN solution at between 200 and 300° C. for between 1 and 10 hrs to yield a thermally-oxidized polyacrylonitrile comprising a ladder structure;

(3) grinding and sieving the thermally-oxidized polyacrylonitrile, and drying a resulting product at room temperature, to yield a thermally-oxidized precursor;

(4) calcining the thermally-oxidized precursor in the presence of an inert gas flow of between 10 and 500 mL/min for between 1 and 24 hrs at a temperature of between 400 and 1000° C., to yield a carbonized precursor; and (5) calcining the carbonized precursor in the presence of an inert gas flow of between 10 and 500 mL/min for between 1 and 10 hrs at a temperature of between 1000 and 3000° C., to yield a graphene material.

In a class of this embodiment, in (1), a dopant is added to and uniformly mixed with the cyclized LPAN solution.

In a class of this embodiment, the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, or a mixture thereof; and the non-metallic dopant is silicon, phosphorus, boron, nitrogen, carbon, sulfur, or a compound thereof, or a mixture thereof.

In a class of this embodiment, a mixing mode of the dopant comprises stirring, ultrasound, and ball milling.

In a class of this embodiment, a solute of the LPAN solution is a liquid acrylonitrile oligomer with a relative molecular weight of between 106 and 100000, a solvent of the LPAN is water, methanol, alcohol, or a mixture thereof, and a mass concentration of the LPAN is between 0.01:1 and 0.8:1.

In a class of this embodiment, the liquid acrylonitrile oligomer is a homopolymer of acrylonitrile.

In a class of this embodiment, the liquid acrylonitrile oligomer is a copolymer of acrylonitrile and a vinyl monomer, and the vinyl monomer is selected from the group of styrene, methyl methacrylate, hydroxyethyl methylacrylate, acrylic acid, and itaconic acid.

In a class of this embodiment, the inert gas in (4) and (5) is nitrogen or argon.

The invention also provides a graphene material, being prepared according to the method.

Advantages of the method of preparing a graphene material according to embodiments of the invention are summarized as follows. The resulting graphene material has high electrical conductivity, high quality and complete carbon layer structure. And the production process is simple and convenient for operation.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method of preparing a graphene material are described below. It should be noted that the following examples are intended to describe and not to limit the invention.

Figure 1:
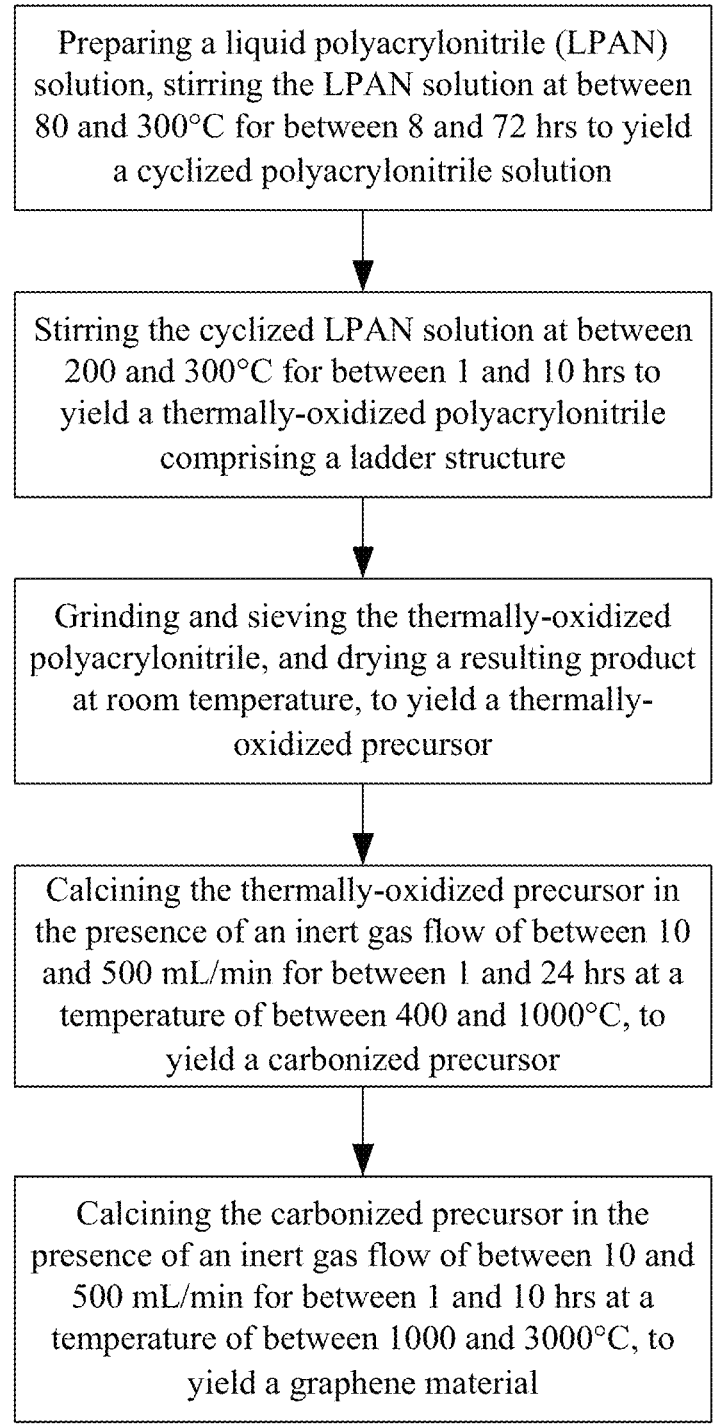
FIG. 1 is a flow diagram of a method of preparing a graphene material in accordance to one embodiment of the invention.

As shown in FIG. 1, a flow diagram of a method of preparing a graphene material is provided. The method comprises:

(1) preparing a liquid polyacrylonitrile (LPAN) solution, stirring the LPAN solution at between 80 and 300° C. for between 8 and 72 hrs to yield a cyclized polyacrylonitrile solution;

(2) stirring the cyclized LPAN solution at between 200 and 300° C. for between 1 and 10 hrs to yield a thermally-oxidized polyacrylonitrile comprising a ladder structure;

(3) grinding and sieving the thermally-oxidized polyacrylonitrile, and drying a resulting product at room temperature, to yield a thermally-oxidized precursor;

(4) calcining the thermally-oxidized precursor in the presence of an inert gas flow of between 10 and 500 mL/min for between 1 and 24 hrs at a temperature of between 400 and 1000° C., to yield a carbonized precursor; and (5) calcining the carbonized precursor in the presence of an inert gas flow of between 10 and 500 mL/min for between 1 and 10 hrs at a temperature of between 1000 and 3000° C., to yield a graphene material.

In (1), the liquid LPAN solution is stirred at the temperature of between 80 and 300° C. for between 8 and 72 hrs to yield the cyclized polyacrylonitrile solution. As a result, the linear LPAN molecule is transformed into a thermostable ladder structure, which can resist the pyrolysis during the high-temperature carbonization, thereby ensuring the high carbon residue rate and stable physicochemical properties. In the end, a carbon layer having a grapheme-like structure is formed.

Preferably, a solute of the LPAN solution is a liquid acrylonitrile oligomer with a relative molecular weight of between 106 and 100000, particularly, between 150 and 25000; a solvent of the LPAN is water, methanol, alcohol, or a mixture thereof, and a mass concentration of the LPAN is between 0.01:1 and 0.08:1. The invention directly employs the PLAN instead of dilute PLAN, that is because the polymer is a long chain macromolecule with high molecular weight and high carbon content, and thus provides a structure base for preparing the graphene material with high graphitization degree.

Preferably, the liquid acrylonitrile oligomer is a homopolymer of acrylonitrile. Optionally, the liquid acrylonitrile oligomer is a copolymer of acrylonitrile and a vinyl monomer, and the vinyl monomer is selected from the group of styrene, methyl methacrylate, hydroxyethyl methylacrylate, acrylic acid, itaconic acid.

Preferably, a dopant is added to and uniformly mixed with the cyclized LPAN solution. The mixing mode is stirring, ultrasound, or ball milling. The cyclized LPAN solution has multiple functional groups, which are adapted to tightly bind to the copper compound. Part of LPAN functional groups can coordinate with the conductive powder to achieve compatibility in the molecular level. After grinding or stirring, the LPAN and the dopant are fully mixed and contacted.

Preferably, the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, or a mixture thereof; and the non-metallic dopant is silicon, phosphorus, boron, nitrogen, carbon, sulfur, or a compound thereof, or a mixture thereof.

Based on mass ratio, a dosage ratio of the dopant to the LPAN solution is between 0.1:1 and 0.9:1, for example, 0.2:1, 0.3:1, 0.4:1, 0.5:1, 0.6:1, 0.7:1, 0.8:1 or 0.9:1.

In (2), the cyclized LPAN solution is heated at between 200 and 300° C. for between 1 and 10 hrs to yield the thermally-oxidized polyacrylonitrile (OPAN) comprising a ladder structure, so that the polyacrylonitrile can resist the pyrolysis during the high-temperature carbonization, thereby ensuring the high carbon residue rate and stable physicochemical properties.

In (3), the sieving process employs a sieve having a mesh of between 200 and 400 meshes.

In (4) and (5), the the inert gas involved in the calcination process is nitrogen or argon.

Example 1

Figure 2A:
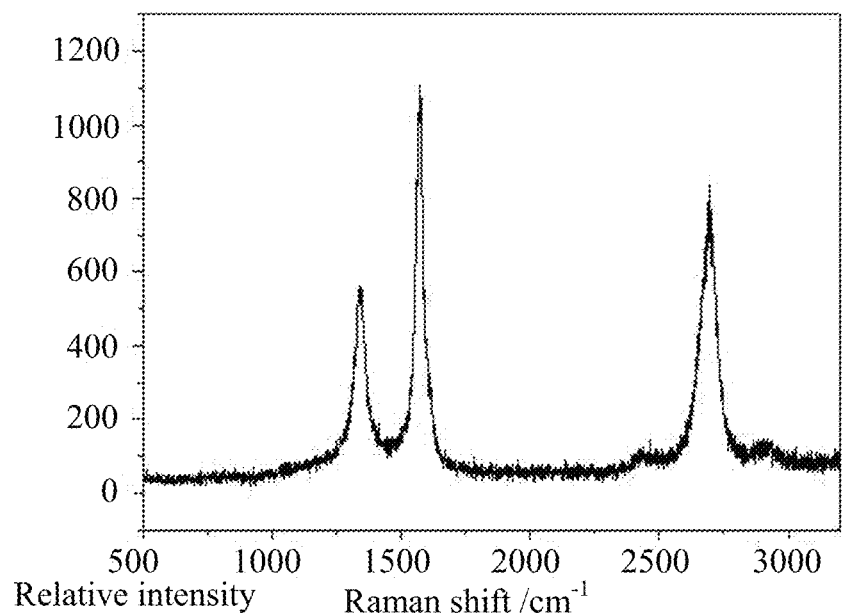
FIG. 2A is a Raman pattern of a graphene material prepared in Example 1.
Figure 2B:
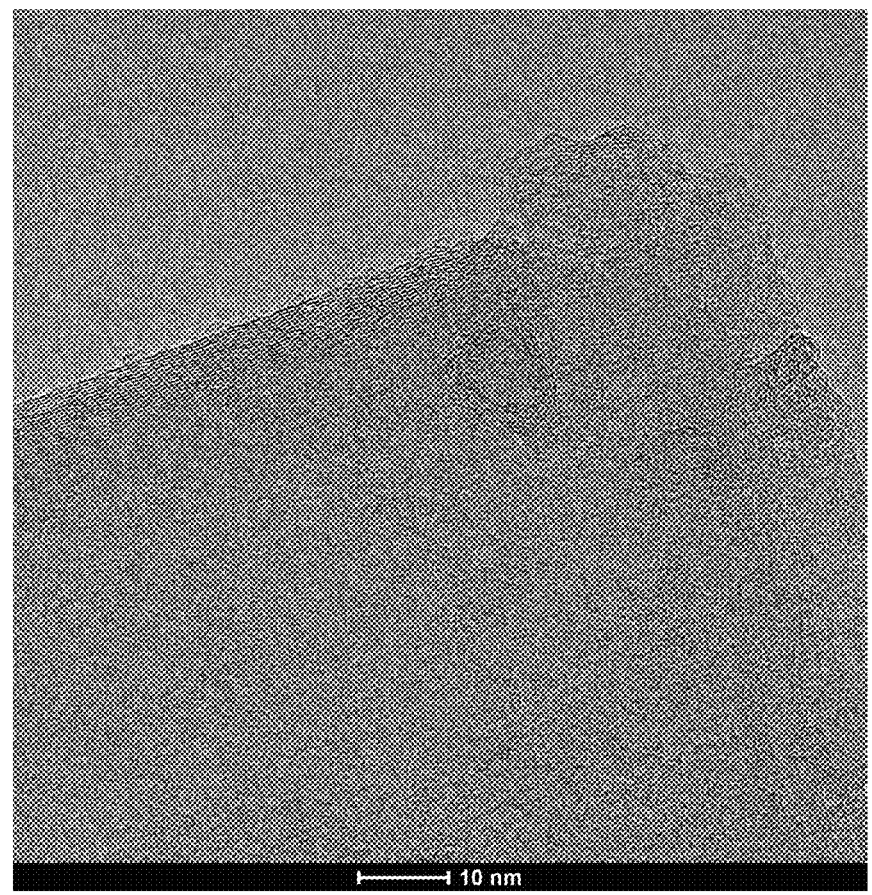
FIG. 2B is a TEM pattern of a graphene material prepared in Example 1.

20 g of liquid polyacrylonitrile (LPAN) solution (molecular weight of 4000) was stirred at 240° C. for 60 hrs, to yield a cyclized polyacrylonitrile solution. The cyclized LPAN solution was heated at 240° C. for 3 hrs to yield a thermally-oxidized polyacrylonitrile (OPAN) comprising a ladder structure. The thermally-oxidized polyacrylonitrile was ball milled using a planetary type ball mill for 8 hrs (400 rad/min), and the ratio of grinding media to material was 15:1. Thereafter, a product was sieved and dried at room temperature, to yield a thermally-oxidized precursor. The thermally-oxidized precursor was calcined in a ceramic boat in the presence of an inert gas flow of 100 mL/min for 8 hrs at the temperature of 900° C., and then was cooled to room temperature, and ground and sieved to yield a low temperature carbonized product, which was transferred to the ceramic boat and calcined again in the presence of an inert gas flow of 100 mL/min for 1 hour at the temperature of 2500° C. to yield a graphene material, the structures thereof are shown in FIGS. 2A-2B. FIG. 2A is a Raman pattern of the graphene material. FIG. 2B is a TEM pattern of the graphene material. As shown in FIG. 2A, the Raman pattern shows that the obtained material is a multilayer graphene material instead of a monolayer material, and the TME pattern testifies the result.

Example 2

Figure 3A:
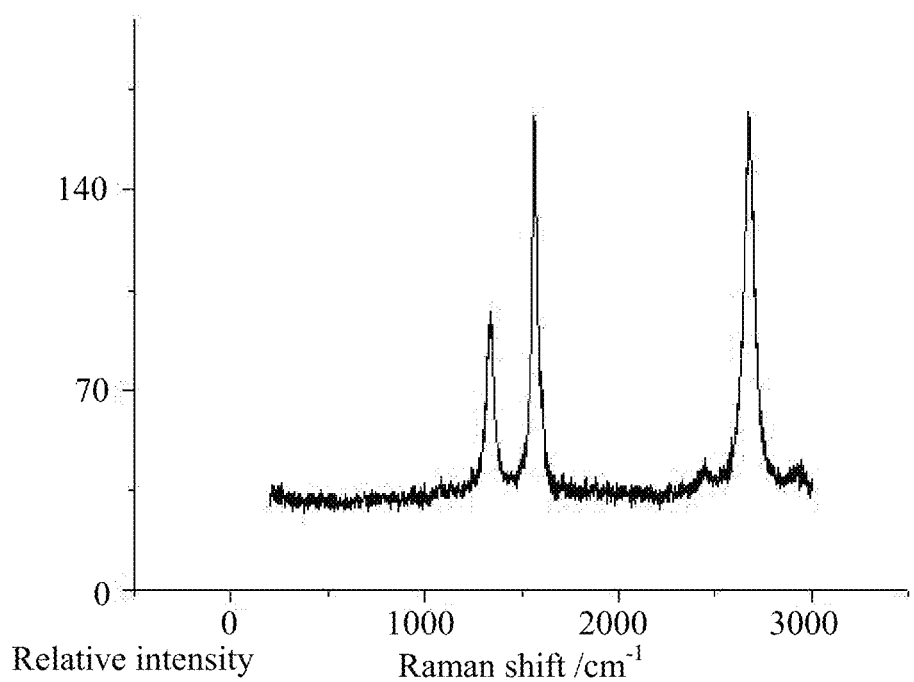
FIG. 3A is a Raman pattern of a graphene material prepared in Example 2.
Figure 3B:
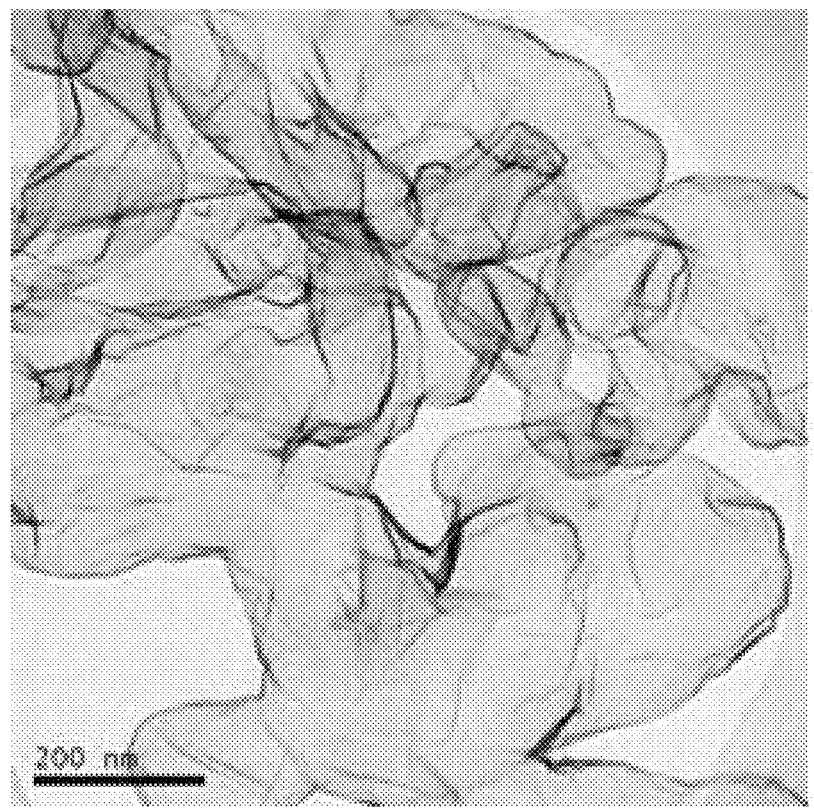
FIG. 3B is a TEM pattern of a graphene material prepared in Example 2.

20 g of liquid polyacrylonitrile (LPAN) solution (molecular weight of 4000) was stirred at 150° C. for 70 hrs, to yield a cyclized polyacrylonitrile solution. The cyclized LPAN solution was heated at 220° C. for 5 hrs to yield a thermally-oxidized polyacrylonitrile (OPAN) comprising a ladder structure. The thermally-oxidized polyacrylonitrile was ball milled using a planetary type ball mill for 8 hrs (400 rad/min), and the ratio of grinding media to material was 15:1. Thereafter, a product was sieved and dried at room temperature, to yield a thermally-oxidized precursor. The thermally-oxidized precursor was calcined in a ceramic boat in the presence of an inert gas flow of 100 mL/min for 8 hrs at the temperature of 900° C., and then was cooled to room temperature, and ground and sieved to yield a low temperature carbonized product, which was transferred to the ceramic boat and calcined again in the presence of an inert gas flow of 100 mL/min for 2 hours at the temperature of 2500° C. to yield a graphene material, the structures thereof are shown in FIGS. 3A-3B. FIG. 3A is a Raman pattern of the graphene material. FIG. 3B is a TEM pattern of the graphene material. As shown in FIG. 3A, the Raman pattern shows that with the increase of the holding time, the graphitization degree of the graphene material is increased, and the layer number decreases, and the TME pattern shows the graphene material is approaching to a monolayer structure.

Example 3

Figure 4A:
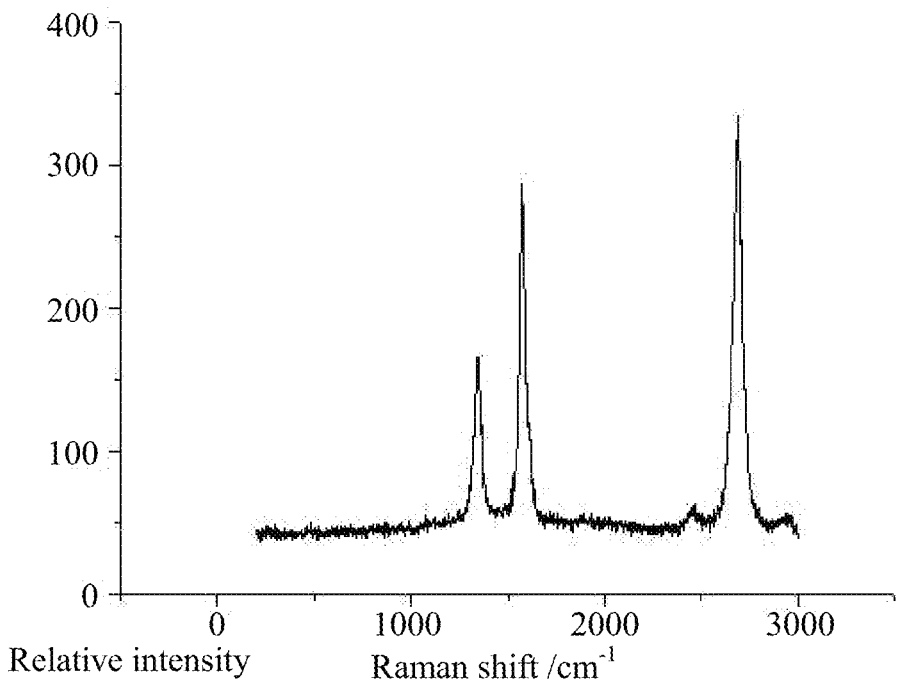
FIG. 4A is a Raman pattern of a graphene material prepared in Example 3.
Figure 4B:
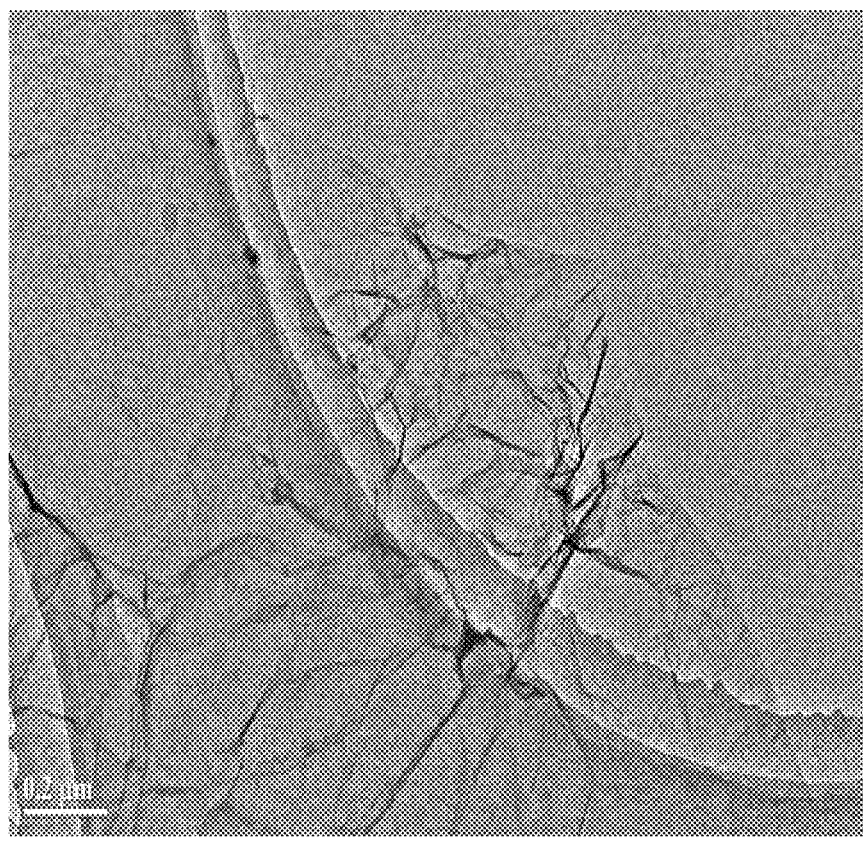
FIG. 4B is a TEM pattern of a graphene material prepared in Example 3.

20 g of liquid polyacrylonitrile (LPAN) solution (molecular weight of 4000) was stirred at 120° C. for 50 hrs, to yield a cyclized polyacrylonitrile solution. The cyclized LPAN solution was heated at 260° C. for 8 hrs to yield a thermally-oxidized polyacrylonitrile (OPAN) comprising a ladder structure. The thermally-oxidized polyacrylonitrile was ball milled using a planetary type ball mill for 8 hrs (400 rad/min), and the ratio of grinding media to material was 15:1. Thereafter, a product was sieved and dried at room temperature, to yield a thermally-oxidized precursor. The thermally-oxidized precursor was calcined in a ceramic boat in the presence of an inert gas flow of 100 mL/min for 8 hrs at the temperature of 900° C., and then was cooled to room temperature, and ground and sieved to yield a low temperature carbonized product, which was transferred to the ceramic boat and calcined again in the presence of an inert gas flow of 100 mL/min for 3 hours at the temperature of 2900° C. to yield a graphene material, the structures thereof are shown in FIGS. 4A-4B. FIG. 4A is a Raman pattern of the graphene material. FIG. 4B is a TEM pattern of the graphene material. The results show that the calcination temperature and the holding time greatly affect the formation of the graphene structure. With the increase of the calcination temperature, as shown in FIG. 4A, the Raman pattern shows that the obtained material is approaching to a monolayer graphene material, and the TME pattern testifies the result.

Example 4

20 g of liquid polyacrylonitrile (LPAN) solution (molecular weight of 2000) was stirred at 80° C. for 72 hrs, to yield a cyclized polyacrylonitrile solution. The cyclized LPAN solution was heated at 250° C. for 5 hrs to yield a thermally-oxidized polyacrylonitrile (OPAN) comprising a ladder structure. The thermally-oxidized polyacrylonitrile was ball milled using a planetary type ball mill for 8 hrs (400 rad/min), and the ratio of grinding media to material was 15:1. Thereafter, a product was sieved and dried at room temperature, to yield a thermally-oxidized precursor. The thermally-oxidized precursor was calcined in a ceramic boat in the presence of an inert gas flow of 10 mL/min for 1 hour at the temperature of 1000° C., and then was cooled to room temperature, and ground and sieved to yield a low temperature carbonized product, which was transferred to the ceramic boat and calcined again in the presence of an inert gas flow of 500 mL/min for 10 hours at the temperature of 1000° C. to yield a graphene material.

Example 5

20 g of liquid polyacrylonitrile (LPAN) solution (molecular weight of 8000) was stirred at 300° C. for 8 hrs, to yield a cyclized polyacrylonitrile solution. The cyclized LPAN solution was heated at 300° C. for 1 hour to yield a thermally-oxidized polyacrylonitrile (OPAN) comprising a ladder structure. The thermally-oxidized polyacrylonitrile was ball milled using a planetary type ball mill for 8 hrs (400 rad/min), and the ratio of grinding media to material was 15:1. Thereafter, a product was sieved and dried at room temperature, to yield a thermally-oxidized precursor. The thermally-oxidized precursor was calcined in a ceramic boat in the presence of an inert gas flow of 500 mL/min for 24 hrs at the temperature of 400° C., and then was cooled to room temperature, and ground and sieved to yield a low temperature carbonized product, which was transferred to the ceramic boat and calcined again in the presence of an inert gas flow of 10 mL/min for 1 hour at the temperature of 3000° C. to yield a graphene material.

Example 6

20 g of liquid polyacrylonitrile (LPAN) solution (molecular weight of 6000) was stirred at 220° C. for 50 hrs, to yield a cyclized polyacrylonitrile solution. The cyclized LPAN solution was heated at 200° C. for 10 hrs to yield a thermally-oxidized polyacrylonitrile (OPAN) comprising a ladder structure. The thermally-oxidized polyacrylonitrile was ball milled using a planetary type ball mill for 8 hrs (400 rad/min), and the ratio of grinding media to material was 15:1. Thereafter, a product was sieved and dried at room temperature, to yield a thermally-oxidized precursor. The thermally-oxidized precursor was calcined in a ceramic boat in the presence of an inert gas flow of 250 mL/min for 12 hrs at the temperature of 900° C., and then was cooled to room temperature, and ground and sieved to yield a low temperature carbonized product, which was transferred to the ceramic boat and calcined again in the presence of an inert gas flow of 200 mL/min for 5 hours at the temperature of 2000° C. to yield a graphene material.

Examples show through the method graphene materials with excellent properties can be prepared, and the method has a simple process and is suitable for large-scale industrial production.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparing a graphene material, comprising:
   (1) preparing a liquid polyacrylonitrile (LPAN) solution, stiffing the LPAN solution at between 80 and 300° C. for between 8 and 72 hrs to yield a cyclized polyacrylonitrile solution;
   (2) stirring the cyclized LPAN solution at between 200 and 300° C. for between 1 and 10 hrs to yield a thermally-oxidized polyacrylonitrile comprising a ladder structure;
   (3) grinding and sieving the thermally-oxidized polyacrylonitrile, and drying a resulting product at room temperature, to yield a thermally-oxidized precursor;
   (4) calcining the thermally-oxidized precursor in the presence of an inert gas flow of between 10 and 500 mL/min for between 1 and 24 hrs at a temperature of between 400 and 1000° C., to yield a carbonized precursor; and
   (5) calcining the carbonized precursor in the presence of an inert gas flow of between 10 and 500 mL/min for between 1 and 10 hrs at a temperature of between 1000 and 3000° C., to yield a graphene material.

2. The method of claim 1, wherein in (1), a dopant is added to and uniformly mixed with the cyclized LPAN solution.

3. The method of claim 2, wherein the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, or a mixture thereof; and the non-metallic dopant is silicon, phosphorus, boron, nitrogen, carbon, sulfur, or a compound thereof, or a mixture thereof.

4. The method of claim 2, wherein a mixing mode of the dopant comprises stiffing, ultrasound, and ball milling.

5. The method of claim 1, wherein a solute of the LPAN solution is a liquid acrylonitrile oligomer with a relative molecular weight of between 106 and 100000, a solvent of the LPAN is water, methanol, alcohol, or a mixture thereof, and a mass concentration of the LPAN is between 0.01:1 and 0.8:1.

6. The method of claim 5, wherein the liquid acrylonitrile oligomer is a homopolymer of acrylonitrile.

7. The method of claim 5, wherein the liquid acrylonitrile oligomer is a copolymer of acrylonitrile and a vinyl monomer, and the vinyl monomer is selected from the group of styrene, methyl methacrylate, hydroxyethyl methylacrylate, acrylic acid, and itaconic acid.

8. The method of claim 1, wherein the inert gas in (4) and (5) is nitrogen or argon.

* * * * *